(12) United States Patent
Poteat

(10) Patent No.: US 8,141,887 B1
(45) Date of Patent: Mar. 27, 2012

(54) GAME GURNEY SYSTEM

(76) Inventor: Donald L. Poteat, Chesterfield, VA (US)

( * ) Notice: Subject to any disclaimer, the term of this patent is extended or adjusted under 35 U.S.C. 154(b) by 303 days.

(21) Appl. No.: 12/360,724

(22) Filed: Jan. 27, 2009

(51) Int. Cl.
*B62B 1/00* (2006.01)
(52) U.S. Cl. .................. 280/47.24; 280/47.18; 280/640
(58) Field of Classification Search .................. 280/640, 280/7.18, 47.24, 7.12, 8, 30, 40, 47.26, 84; 224/156
See application file for complete search history.

(56) References Cited

U.S. PATENT DOCUMENTS

| | | | | |
|---|---|---|---|---|
| 5,820,141 A | * | 10/1998 | Wilkerson et al. | 280/30 |
| 5,887,879 A | * | 3/1999 | Chumley | 280/40 |
| 6,260,864 B1 | * | 7/2001 | Smith | 280/47.26 |
| 6,270,092 B2 | * | 8/2001 | Darling, III | 280/30 |
| 6,308,968 B1 | * | 10/2001 | Hollingsworth | 280/47.24 |
| 6,581,945 B1 | * | 6/2003 | Shapiro | 280/30 |
| 6,942,228 B2 | * | 9/2005 | Bunce et al. | 280/30 |
| 2004/0065708 A1 | * | 4/2004 | Amram | 224/579 |
| 2004/0130112 A1 | * | 7/2004 | Doyle | 280/47.26 |

* cited by examiner

*Primary Examiner* — J. Allen Shriver, II
*Assistant Examiner* — James M Dolak

(57) ABSTRACT

A tubular frame has leading and trailing sections. The leading section has a leading end with parallel rearwardly extending legs. The trailing section has a trailing end with parallel forwardly extending legs receiving the rearwardly extending legs. An axle has central and end sections with wheels rotatably mounted on the end sections. A riser plate has a lower edge pivotably coupled to the axle. The riser plate has an upper edge with a concave curve. The riser plate is pivotably coupled to the frame. A handle assembly has a tubular grip with parallel downwardly extending arms. The handle assembly also has parallel upwardly extending arms receiving the downwardly extending arms. The upwardly extending arms are pivotably coupled to the axle.

9 Claims, 3 Drawing Sheets

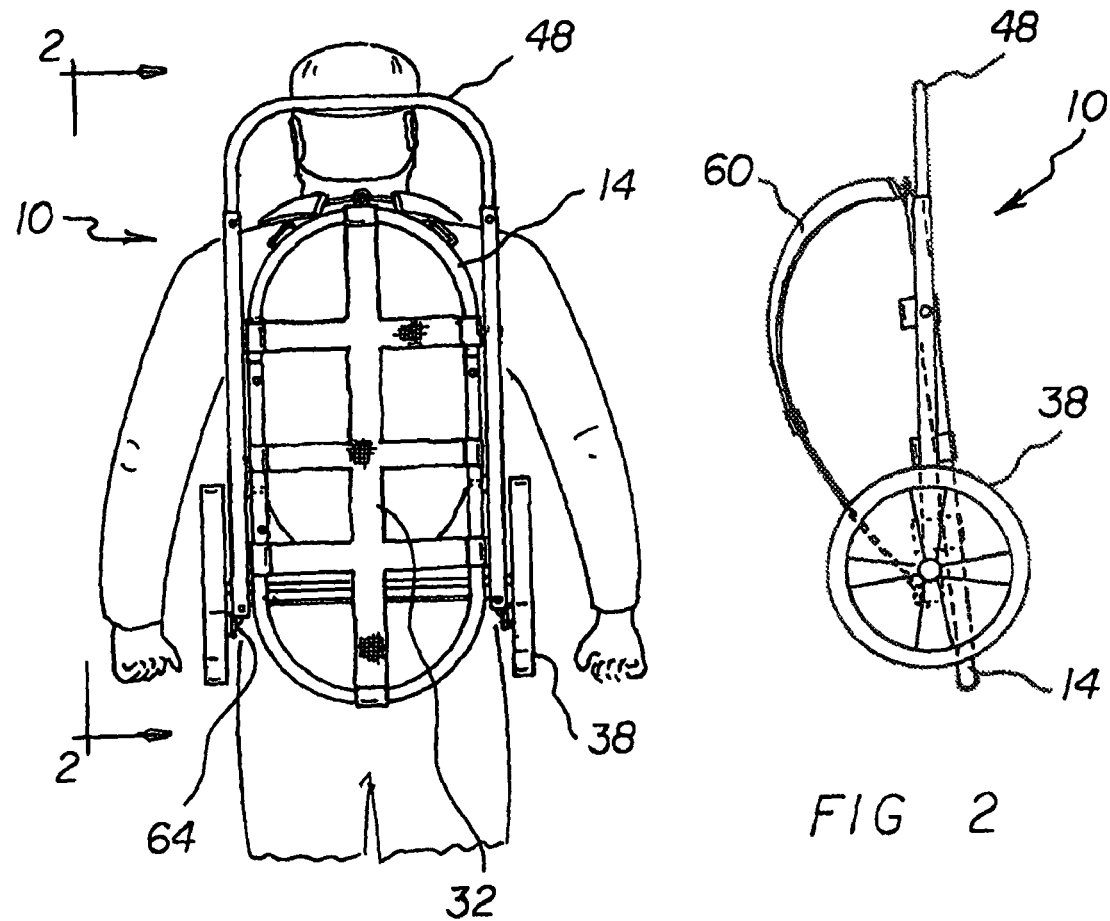

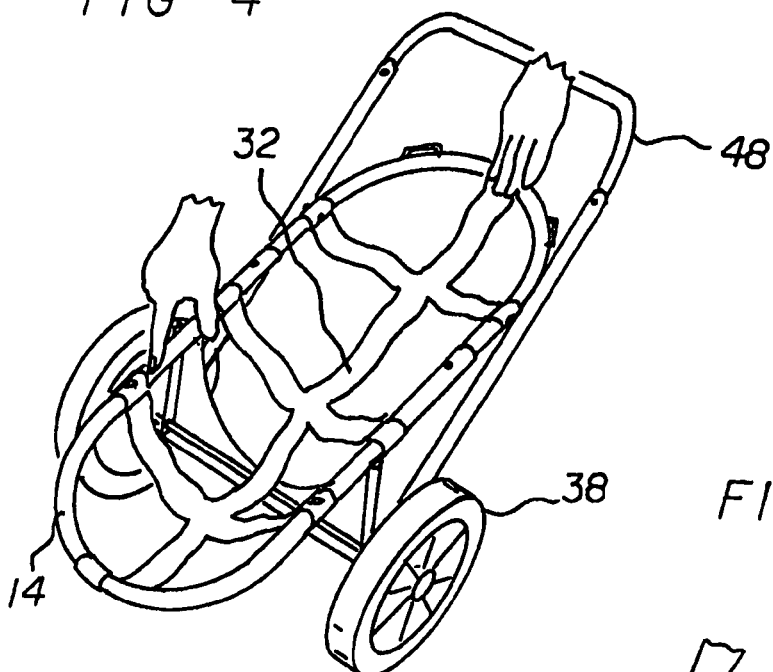
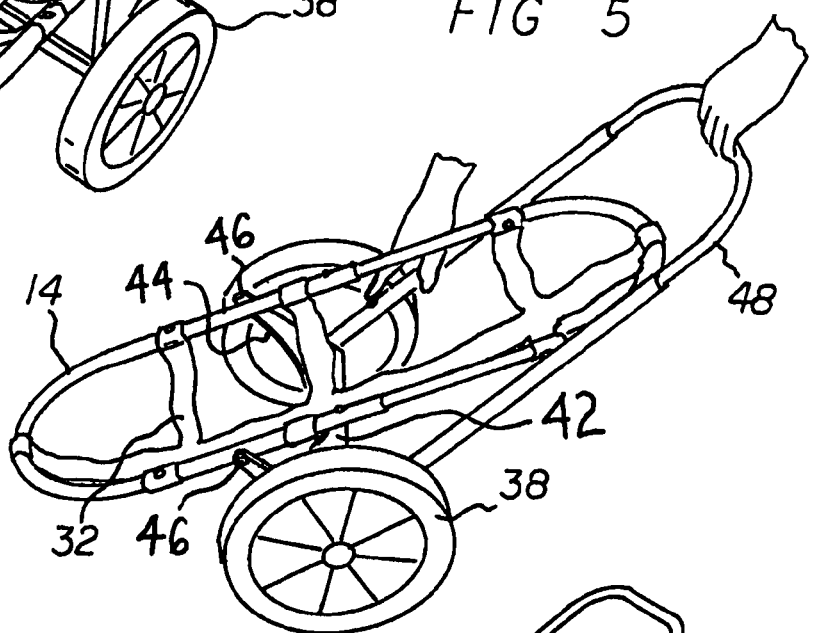
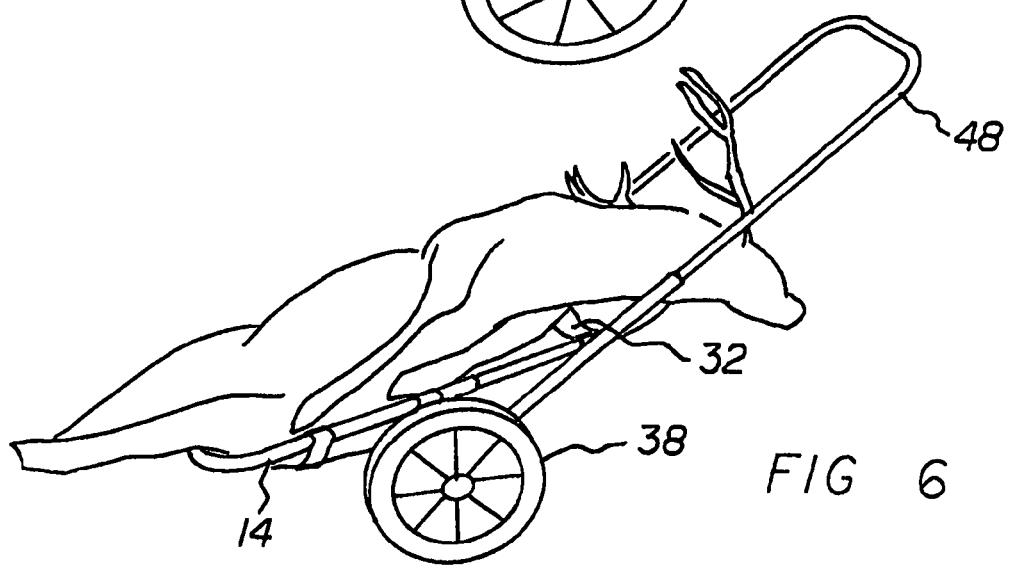

GAME GURNEY SYSTEM

BACKGROUND OF THE INVENTION

1. Field of the Invention

The present invention relates to a game gurney system and more particularly pertains to transporting game from the field to a point of departure, the system adapted to be telescopically converted between an expanded operative orientation for use and a collapsed inoperative orientation for carrying and storing, the transporting and converting being done in a safe, convenient and economical manner.

2. Description of the Prior Art

The use of game carriers of known designs and configurations is known in the prior art. More specifically, game carriers of known designs and configurations previously devised and utilized for the purpose of carrying game through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,161,850 issued Dec. 19, 2000 to James relates to a Big Game Gurney. U.S. Pat. No. 2,624,588 issued Jan. 6, 1953 to Jones relates to a Retractable Runner and Wheeled Tyke of Game Carrier. Lastly, U.S. Pat. No. 2,183,066 issued Dec. 12, 1939 to Fields relates to a Two-Wheel Hand Cart.

While these devices fulfill their respective, particular objectives and requirements, the aforementioned patents do not describe a game gurney system that allows for transporting game from the field to a point of departure, the system adapted to be telescopically converted between an expanded operative orientation for use and a collapsed inoperative orientation for carrying and storing, the transporting and converting being done in a safe, convenient and economical manner.

In this respect, the game gurney system according to the present invention substantially departs from the conventional concepts and designs of the prior art, and in doing so provides an apparatus primarily developed for the purpose of transporting game from the field to a point of departure, the system adapted to be telescopically converted between an expanded operative orientation for use and a collapsed inoperative orientation for carrying and storing, the transporting and converting being done in a safe, convenient and economical manner.

Therefore, it can be appreciated that there exists a continuing need for a new and improved game gurney system which can be used for transporting game from the field to a point of departure, the system adapted to be telescopically converted between an expanded operative orientation for use and a collapsed inoperative orientation for carrying and storing, the transporting and converting being done in a safe, convenient and economical manner. In this regard, the present invention substantially fulfills this need.

SUMMARY OF THE INVENTION

In view of the foregoing disadvantages inherent in the known types of game carriers of known designs and configurations now present in the prior art, the present invention provides an improved game gurney system. As such, the general purpose of the present invention, which will be described subsequently in greater detail, is to provide a new and improved game gurney system and method which has all the advantages of the prior art and none of the disadvantages.

To attain this, the present invention essentially comprises a game gurney system. First provided is a tubular frame. The frame is formed in a generally oval configuration. The frame has a leading section. The frame has a similarly configured trailing section. The leading section has a leading end. The leading end is in a semicircular configuration. The leading end has parallel rearwardly extending legs. The trailing section has a trailing end. The trailing end is in a semicircular configuration. The trailing end has parallel forwardly extending legs. The rearwardly extending legs are slidably received in the forwardly extending legs. In this manner length adjustment is provided. A locking assembly is formed of axially space apertures. The apertures are provided in each of the forwardly extending legs. An associated spring urged button is provided. The button is provided on each of the rearwardly extending legs. The button is extendable through one of the apertures. The buttons are adapted to be depressed. The forwardly extending and rearwardly extending legs are adapted to be slid with respect to each other. In this manner the buttons in the apertures may be located. Further in this manner the length of the frame may be increased and decreased. Strapping is provided. The strapping is provided within the frame. The strapping has free ends. The free ends of the strapping are coupled to the frame. The strapping is adapted to support game.

An axle is provided. The axle is located beneath the frame. The axle has a central section. The axle has end sections. Wheels are provided. The wheels are rotatably mounted on the end sections of the axle.

Provided next is a riser plate. The riser plate has a linear lower edge. The riser plate is pivotably coupled to the axle between the wheels. The riser plate has parallel side edges. The riser plate has an upper edge. The riser plate has a concave curve. The riser plate is sized and shaped to accommodate the game supported on the strapping. Pins are provided. The pins pivotably couple the side edges of the riser plate to the forwardly extending legs.

A handle assembly is provided next. The handle assembly has a tubular grip. The grip is provided in an inverted generally U-shaped configuration. The grip includes parallel downwardly extending arms. The handle assembly also has parallel upwardly extending arms. The upwardly extending arms slidably receive the downwardly extending arms. A second locking assembly is provided. The second locking assembly has axially spaced holes. The holes are provided in each of the upwardly extending arms. A second spring urged button is provided. The second button is provided on each of the downwardly extending arms. The second button is extendable through one of the holes. The second buttons are adapted to be depressed. The upwardly and downwardly extending arms are adapted to be slid with respect to each other. In this manner the second buttons may be located in the holes of the upwardly extending arms. Further in this manner the length of the handle assembly may be increased and decreased. The upwardly extending arms have lower ends. The lower ends of the upwardly extending arms are pivotably coupled to the axle between the riser plate and the wheels.

Further provided are shoulder straps. In this manner the system is carried. The shoulder straps have upper and lower ends. The shoulder straps have an upper eyelet. The upper eyelet is provided at the leading end of the leading section. The upper eyelet receives the upper ends of the straps. The shoulder straps have lower eyelets. The lower eyelets are provided on the upwardly extending arms.

Provided last are D-rings. The D-rings are laterally spaced on the leading end of the frame. The D-rings laterally receive the straps of a back pack to be carried with the system.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved game gurney system which has all of the advantages of the prior art game carriers of known designs and configurations and none of the disadvantages.

It is another object of the present invention to provide a new and improved game gurney system which may be easily and efficiently manufactured and marketed.

It is further object of the present invention to provide a new and improved game gurney system which is of durable and reliable constructions.

An even further object of the present invention is to provide a new and improved game gurney system which is susceptible of a low cost of manufacture with regard to both materials and labor, and which accordingly is then susceptible of low prices of sale to the consuming public, thereby making such game gurney system economically available to the buying public.

Even still another object of the present invention is to provide a game gurney system for transporting game from the field to a point of departure, the system adapted to be telescopically converted between an expanded operative orientation for use and a collapsed inoperative orientation for carrying and storing, the transporting and converting being done in a safe, convenient and economical manner.

Lastly, it is an object of the present invention to provide a new and improved game gurney system. A tubular frame has leading and trailing sections. The leading section has a leading end with parallel rearwardly extending legs. The trailing section has a trailing end with parallel forwardly extending legs receiving the rearwardly extending legs. An axle has central and end sections with wheels rotatably mounted on the end sections. A riser plate has a lower edge pivotably coupled to the axle. The riser plate has an upper edge with a concave curve. The riser plate is pivotably coupled to the frame. A handle assembly has a tubular grip with parallel downwardly extending arms. The handle assembly also has parallel upwardly extending arms receiving the downwardly extending arms. The upwardly extending arms are pivotably coupled to the axle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a game gurney system constructed in accordance with the principles of the present invention.

FIG. 2 is a side elevational view of the system taken along line 2-2 of FIG. 1.

FIGS. 4, 5 and 6 are perspective illustrations of the system shown in the prior Figures, the system being illustrated in various stages of assembly and use.

The same reference numerals refer to the same parts throughout the various Figures.

DESCRIPTION OF THE PREFERRED EMBODIMENT

Figure 3:
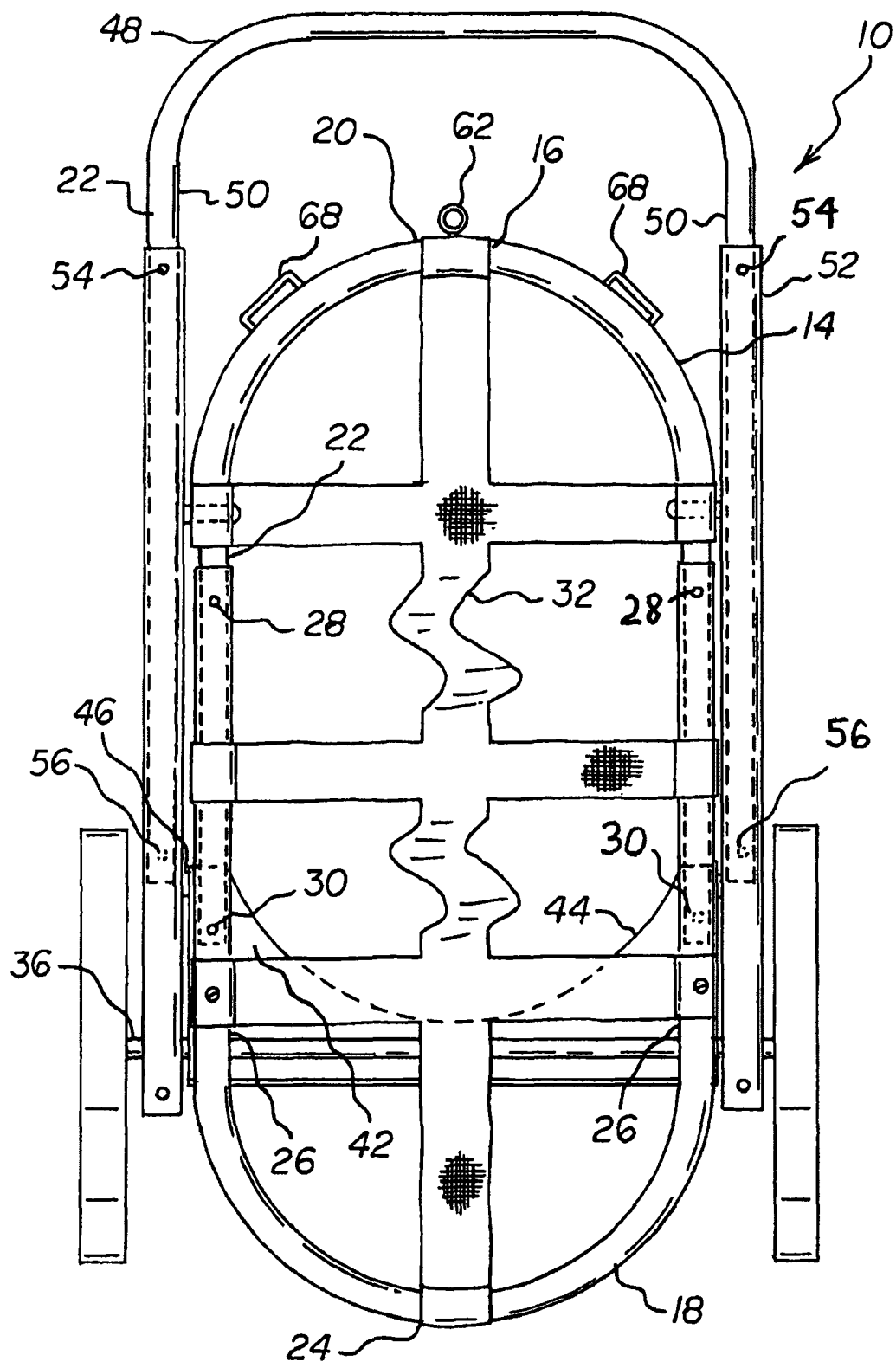
FIG. 3 is an enlarged plan view of the system similar to FIG. 1 but with the system removed from a user's back.

With reference now to the drawings, and in particular to FIG. 1 thereof, the preferred embodiment of the new and improved game gurney system embodying the principles and concepts of the present invention and generally designated by the reference numeral 10 will be described.

The present invention, the game gurney system 10 is comprised of a plurality of components. Such components in their broadest context include a tubular frame, an axle, a riser plate and a handle assembly. Such components are individually configured and correlated with respect to each other so as to attain the desired objective.

First provided is a tubular frame 14. The frame is formed in a generally oval configuration. The frame has a leading section 16. The frame has a similarly configured trailing section 18. The leading section has a leading end 20. The leading end is in a semicircular configuration. The leading end has parallel rearwardly extending legs 22. The trailing section has a trailing end 24. The trailing end is in a semicircular configuration. The trailing end has parallel forwardly extending legs 26. The rearwardly extending legs are slidably received in the forwardly extending legs. In this manner length adjustment is provided. A locking assembly is formed of axially space apertures 28. The apertures are provided in each of the forwardly extending legs. An associated spring urged button 30 is provided. The button is provided on each of the rearwardly extending legs. The button is extendable through one of the apertures. The buttons are adapted to be depressed. The forwardly extending and rearwardly extending legs are adapted to be slid with respect to each other. In this manner the buttons in the apertures may be located. Further in this manner the length of the frame may be increased and decreased. Strapping is provided. The strapping is provided within the frame. The strapping has free ends. The free ends of the strapping are coupled to the frame. The strapping is adapted to support game. An axle 36 is provided. The axle is located beneath the frame. The axle has a central section. The axle has end sections. Wheels 38 are provided. The wheels are rotatably mounted on the end sections of the axle.

Provided next is a riser plate 42. The riser plate has a linear lower edge. The riser plate is pivotably coupled to the axle between the wheels. The riser plate has parallel side edges. The riser plate has an upper edge. The riser plate has a concave curve 44. The riser plate is sized and shaped to accommodate the game supported on the strapping. Pins 46 are provided. The pins pivotably couple the side edges of the riser plate to the forwardly extending legs.

A handle assembly is provided next. The handle assembly has a tubular grip 48. The grip is provided in an inverted generally U-shaped configuration. The grip includes parallel downwardly extending arms 50. The handle assembly also has parallel upwardly extending arms 52. The upwardly extending arms slidably receive the downwardly extending arms. A second locking assembly is provided. The second locking assembly has axially spaced holes 59. The holes are provided in each of the upwardly extending arms. A second spring urged button 56 is provided. The second button is provided on each of the downwardly extending arms. The second button is extendable through one of the holes. The second buttons are adapted to be depressed. The upwardly and downwardly extending arms are adapted to be slid with respect to each other. In this manner the second buttons may be located in the holes of the upwardly extending arms. Further in this manner the length of the handle assembly may be increased and decreased. The upwardly extending arms have lower ends. The lower ends of the upwardly extending arms are pivotably coupled to the axle between the riser plate and the wheels.

Further provided are shoulder straps 60. In this manner the system is carried. The shoulder straps have upper and lower ends. The shoulder straps have an upper eyelet 62. The upper eyelet is provided at the leading end of the leading section. The upper eyelet receives the upper ends of the straps. The shoulder straps have lower eyelets 64. The lower eyelets are provided on the upwardly extending arms.

Provided last are D-rings 68. The D-rings are laterally spaced on the leading end of the frame. The D-rings laterally receive the straps of a back pack to be carried with the system.

The purpose of the present invention, the game gurney system, is to transport big game animals such as deer, antelope and small bears out of the field. It also doubles as a pack frame.

The game gurney system is a telescopic collapsible cart that transforms from a pack frame into a game cart. Its main function is to transport big game animals out of the field from the place of kill to a place of departure to one's home or to a processing plant. The game gurney system differs from other game carts on the market.

The game gurney system doubles as a pack frame. Its "D" rings allow for easy attachment of a back pack. It folds down to approximately 2.5 in. in thickness.

The game gurney system, from a construction standpoint, has no nuts or bolts to lose. No assembly is necessary prior to or after arrival in the field. With the push of one's thumb & index fingers on the spring-loaded button locks, the game gurney system will open from its pack frame configuration to a game cart in as little as 5 seconds. This is made possible by the unique telescopic tubular design as well as the riser plate. The riser plate is a unique component of the game gurney system and is the key to its function. It forms the axis of symmetry for the cart as well as the pivot point for the telescopic design. Without the riser plate, the push button locks could not be used. This feature makes the game gurney system unlike a lot of other game carts where assembly with nuts & bolts is necessary prior to use.

The game gurney system weighs only 15 pounds, making it the lightest game cart on the market today. The steel tubular design maximizes strength & stability, while minimizing weight. The weight can be reduced further, by approximately one-third, by using lighter materials such as aluminum or composites.

The game gurney system is symmetric, designed to center balance game animals such as deer & antelope over its wheels, thereby making for an easy extraction of game animals from the field. It also was designed to have a low center of gravity to aid in traversing uneven ground.

There are alternate embodiments of the game gurney system. Different sizes of the game gurney system accommodate different size big game animals, i.e., a standard size for most south, south-eastern whitetails, for mid-west antelope, etc. and a magnum game gurney system sized for larger north and northwestern white tails, mule deer and large hogs. The mangum size necessitates enlarging the cart's frame width by 2 or 3 inches and its length by 4 or 5 inches. A larger diameter tube or increased wall thickness on all frame parts, along with a larger and stronger riser plate and stronger wheels increase the magnum size gurney's load capacity.

It is possible to increase the strength of the tabs on the riser plate by making them 2 times longer, then bending the tab over 180 degrees at the point of their current length and spot welding the extra length of tab to the existing tab and riser plate. This will increase side load stress capacity exerted in rough terrain. Also round corners of the tab will protect from being scratched.

Variations and alternate embodiments of the back-pack and tie-down D rings include spot welding two each at ⅛ inch diameter by 1 2×4 offset D rings on both sides of the strut arms, one each side just above the wheels and riser plate tab and one on each side 3 inches below the top of the strut arm.

In another embodiment, two D rings are installed 3 or 4 inches from center on top and bottom of radius frame assembly. This would accommodate back-pack accessories as well as allowing extra tie down capability.

In another, the two top D rings located on the top radius frame assembly could be modified into a double D ring at 90 degrees to each other. This would accommodate not only a back pack but padded shoulder straps sold as an accessory instead of standard nylon straps.

In another, the wheels could be upgraded to a lighter, stronger polymer with greater load bearing capacity. However, its recommended not to increase the wheel height because doing so would take away the low profile and thus reduce stability on hilly terrain. It is also recommended not to use a spoke wheel, which has a tendency to hang sticks and brush when used in certain types of terrain.

Added comfort is provided to the system by adding a Neoprene rubber coating on top of the pull handle to reduce noise made by brush slapping during transporting. It would also be easier on the hands when transporting a game animal. Also, the cart could be fabricated of aircraft aluminum to reduce overall weight. The frame webbing could be stitched with a stronger material such as nylon.

Added accessories are adapted to be provided to the system. A back-pack designed with additional side straps would accommodate D rings on the cart. Nylon tie-down straps provide for game and extra accessories. Padded back-pack straps accept D rings on the cart.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game gurney system comprising:
   a tubular frame having leading and trailing sections, the leading section having a leading end with parallel rearwardly extending legs, the trailing section having a trailing end with parallel forwardly extending legs receiving the rearwardly extending legs;
   an axle having central and end sections with wheels rotatably mounted on the end sections;
   a riser plate having a lower edge pivotably coupled to the axle, the riser plate having an upper edge with a concave curve, the riser plate being pivotably coupled to the frame; and
   a handle assembly having a tubular grip with parallel downwardly extending arms, the handle assembly also having parallel upwardly extending arms receiving the downwardly extending arms, the upwardly extending arms being pivotably coupled to the axle.

2. The system as set forth in claim 1 and further including a locking assembly formed of axially spaced apertures in each of the forwardly extending legs and an associated spring urged button on each of the rearwardly extending legs and extendable through one of the apertures, the buttons adapted to be depressed and the forwardly and rearwardly extending legs slid with respect to each other for locating the buttons in the axially spaced apertures of the forwardly extending legs for increasing and decreasing the length of the frame.

3. The system as set forth in claim 1 and further including a locking assembly formed of axially spaced holes in each of the upwardly extending arms and an associated spring urged button on each of the downwardly extending arms and extendable through one of the holes, the buttons adapted to be depressed and the upwardly and downwardly extending arms slid with respect to each other for locating the buttons in the holes for increasing and decreasing the length of the handle assembly.

4. The system as set forth in claim 1 and further including strapping within the frame, the strapping having free ends coupled to the frame, the strapping adapted to support game.

5. The system as set forth in claim 1 and further including shoulder straps for carrying the system, the shoulder straps having upper and lower ends, an upper eyelet at the leading end of the leading section for receiving the upper ends of the straps, lower eyelets on the upwardly extending arms.

6. The system as set forth in claim 5 and further including D-rings laterally spaced on the leading end of the frame for receiving straps of a back pack to be carried with the system.

7. A game gurney system for transporting game from the field to a point of departure, the system adapted to be telescopically converted between an expanded operative orientation for use and a collapsed inoperative orientation for carrying and storing, the transporting and converting being done in a safe, convenient and economical manner, the system comprising, in combination:
   a tubular frame formed in a generally oval configuration, the frame having a leading section and a similarly configured trailing section, the leading section having a leading end in a semicircular configuration with parallel rearwardly extending legs, the trailing section having a trailing end in a semicircular configuration with parallel forwardly extending legs, the rearwardly extending legs being slidably received in the forwardly extending legs for length adjusting purposes, a locking assembly formed of axially space apertures in each of the forwardly extending legs and an associated spring urged button on each of the rearwardly extending legs and extendable through one of the apertures, the buttons adapted to be depressed and the forwardly extending and rearwardly extending legs slid with respect to each other for locating the buttons in the apertures for increasing and decreasing a length of the frame, strapping within the frame having free ends coupled to the frame, the strapping adapted to support game;
   an axle located beneath the frame, the axle having a central section and end sections, wheels rotatably mounted on the end sections of the axle;
   a riser plate having a linear lower edge pivotably coupled to the axle between the wheels, the riser plate having parallel side edges and an upper edge with a concave curve sized and shaped to accommodate the game supported on the strapping, pins pivotably coupling the side edges of the riser plate to the forwardly extending legs;
   a handle assembly having a tubular grip in an inverted generally U-shaped configuration, the grip including parallel downwardly extending arms, the handle assembly also having parallel upwardly extending arms slidably receiving the downwardly extending arms, a second locking assembly formed with axially spaced holes in each of the upwardly extending arms and a second spring urged button on each of the downwardly extending arms and extendable through one of the holes, the second buttons adapted to be depressed and the upwardly and downwardly extending arms slid with respect to each other for locating the second buttons in the holes of the upwardly extending arms for increasing and decreasing the length of the handle assembly, the upwardly extending arms having lower ends pivotably coupled to the axle between the riser plate and the wheels;
   shoulder straps for carrying the system, the shoulder straps having upper and lower ends, an upper eyelet at the leading end of the leading section for receiving the upper ends of the straps, lower eyelets on the upwardly extending arms; and
   D-rings laterally spaced on the leading end of the frame for receiving straps of a back pack to be carried with the system.

8. A game gurney system comprising:
   a tubular frame having leading and trailing sections, the leading section having a leading end with parallel rearwardly extending legs, the trailing section having a trailing end with parallel forwardly extending legs receiving the rearwardly extending legs;
   an axle having central and end sections with wheels rotatably mounted on the end sections;
   a riser plate having parallel side edges and pins pivotally coupling the side edges of the riser plate to the forwardly extending legs; and a handle assembly having a tubular grip with parallel downwardly extending arms, the handle assembly also having parallel upwardly extending arms receiving the downwardly extending arms, the upwardly extending arms being pivotably coupled to the axle.

9. A game gurney system comprising:

a tubular frame having leading and trailing sections the leading section having a leading end with parallel rearwardly extending legs, the trailing section having a trailing end with parallel forwardly extending legs receiving the rearwardly extending legs, the tubular frame having a locking assembly formed of axially spaced apertures in each of the forwardly extending legs and an associated spring urged button on each of the rearwardly extending legs that is extendable through one of the apertures;

an axle having central and end sections with wheels rotatably mounted on the end sections;

a riser plate having a lower edge pivotably coupled to the axle, the riser plate having an upper edge with a concave curve, the riser plate being pivotably coupled to the frame; and a handle assembly having a tubular grip with parallel downwardly extending arms, the handle assembly also having parallel upwardly extending arms receiving the downwardly extending arms, the upwardly extending arms being pivotably coupled to the axle, the handle assembly having a second locking assembly formed with axially spaced holes in each of the upwardly extending arms and a second spring urged button on each of the downwardly extending arms that is extendable through one of the holes.

* * * * *